(12) United States Patent
Strack et al.

(10) Patent No.: US 7,992,314 B2
(45) Date of Patent: Aug. 9, 2011

(54) MEASURING DEVICE FOR FAST MEASUREMENTS

(75) Inventors: Peter Strack, Chanteheux (FR); Jens Stockburger, Heiningen (DE); Zoran Ostric, Altbach (DE)

(73) Assignee: Carl Mahr Holding GmbH, Göttingen (DE)

( * ) Notice: Subject to any disclaimer, the term of this patent is extended or adjusted under 35 U.S.C. 154(b) by 375 days.

(21) Appl. No.: 12/313,061

(22) Filed: Nov. 17, 2008

(65) Prior Publication Data

US 2009/0071024 A1    Mar. 19, 2009

Related U.S. Application Data

(63) Continuation-in-part of application No. PCT/EP2007/004194, filed on May 11, 2007.

(30) Foreign Application Priority Data

May 18, 2006  (DE) ..................... 10 2006 023 292.5

(51) Int. Cl.
*G05B 19/42* (2006.01)
*G01B 5/02* (2006.01)
*G01B 5/004* (2006.01)

(52) U.S. Cl. ............... 33/504; 33/503; 33/832; 702/168

(58) Field of Classification Search ............... 33/832, 33/502, 503, 504, 505; 702/94, 95, 168
See application file for complete search history.

(56) References Cited

U.S. PATENT DOCUMENTS

| | | | | |
|---|---|---|---|---|
| 3,895,356 A * | 7/1975 | Kraus | ............................. | 702/161 |
| 4,380,873 A * | 4/1983 | Ayres et al. | ................... | 33/501.9 |
| 4,459,755 A * | 7/1984 | Gruhler | ........................... | 33/832 |
| 4,679,326 A * | 7/1987 | Takizawa et al. | ................ | 33/832 |
| 5,148,600 A * | 9/1992 | Chen et al. | ....................... | 33/1 M |
| 5,781,450 A * | 7/1998 | Glasson | ........................ | 702/153 |
| 5,862,604 A * | 1/1999 | Fuchs et al. | ...................... | 33/503 |
| 6,546,643 B2 * | 4/2003 | Lotze et al. | ...................... | 33/559 |
| 7,784,333 B2 * | 8/2010 | Nemoto et al. | ................. | 73/105 |
| 2004/0103548 A1 | 6/2004 | Jordil | | |

FOREIGN PATENT DOCUMENTS

| | | |
|---|---|---|
| DE | 19641720 A1 * | 4/1998 |
| DE | 102 15 188 B4 | 12/2005 |
| JP | 2001051713 A * | 2/2001 |

* cited by examiner

*Primary Examiner* — R. A. Smith
(74) *Attorney, Agent, or Firm* — R. S. Lombard; K. Bach

(57) ABSTRACT

An elevation measuring device comprises a measuring column at which a vertically movable measuring slide is supported, so it can be moved by hand and also by a drive motor through a clutch device. The measuring slide supports a scan head, which imparts a constant measuring force onto the measuring location at the work piece, which is generated by the drive motor and the clutch device. A measuring system detects the elevation coordinate of the scan head and hands said elevation coordinate to a control device for further processing and evaluation. The control device comprises logic for automating the measuring process. This logic automatically detects a positioning of the scan head in a certain direction, which is manually performed by the operator, subsequently controls the drive motor in a suitable manner in order to cause a scanning of the work piece and determines the measurement values.

25 Claims, 6 Drawing Sheets

MEASURING DEVICE FOR FAST MEASUREMENTS

CROSS-REFERENCE TO RELATED APPLICATION

This is a continuation-in-part application of pending international application PCT/EP 2007/004194 filed May 11, 2007 and claiming the priority of German application No. 10 2006 023 292.5 filed May 18, 2006.

BACKGROUND OF THE INVENTION

The present invention relates to a one dimensional length measuring device, which is easy to operate, and in particular, to an elevation measuring device, and a multidimensional coordinate measuring device.

Such measuring devices are used for measuring the dimensions, the three-dimensional shape and similar of an object. Thus, it is required, for example, when producing mechanical components to test the fabrication precision of a work piece between various fabrication steps. Thus, in a particular case, many single measurements or even a point by point measurement of entire surface portions has to be performed. The duration and the complexity of a measurement can be high, in particular, when entire batches of work pieces have to be tested.

From DE 102 15 188 B4, a digital elevation measuring device with a measurement column is known, at which a measurement slide is supported, so it can be adjusted in elevation, and which supports a measurement head with a scan element for scanning a test specimen. For vertical positioning of the measuring head, an electric motor is disposed in the base of the measuring column, which drives a pulley roller with a constant friction moment through a friction clutch, wherein a drive belt, which is connected to the measuring slide, is provided over said pulley roller. A handle is mounted to the measuring slide, in order to be able to position the measuring slide also by hand when required.

During operation, the measuring column is placed onto a stable measuring plate, on which an operator positions the test specimen to be measured in a manner suitable for the measuring function to be performed respectively. When, for example, an upper surface is to be measured, the test specimen is disposed below the measuring head. Thereafter, the operator actuates the associated measuring function key at a computer, for example, "scan surface from above", in order to start said measuring function. The motor drives the measurement slides against the point to be measured, and loads the scan element with a constant measuring force through the friction clutch. The elevation coordinate of the measurement point is measured and displayed relative to the surface of the measuring plate, which serves as a reference.

The elevation measuring device has proven to be useful in practical applications. It enables an operator to perform various measuring functions in a comparatively simple manner, for example, measuring a surface, bore hole or shaft, from above or from below. The measuring function is selected by a simple key stroke or through a selection menu on the computer. For this purpose, however, the operator has to briefly look away from the work piece, which disturbs the workflow.

In another type of elevation measuring devices, the scan element is moved onto the surface to be measured by a mechanical turning wheel or by another mechanical or electronic control organ, until the scan element contacts said surface. The scanning is detected by a contact sensor, and subsequently, the measurement value is taken and displayed.

An example for an elevation measuring device with a contact signal sensor and associated processing logic can be derived from DE 35 41 043 A1.

Through the contact signal sensor, the execution of a measurement is facilitated, however, the complexity of the elevation measuring device is increased. Furthermore, a fine positioning of the scan head is not easy with the control organ without sufficient practice, and it is perceived as complicated, when it has to be performed with mechanical control elements, for example, a hand crank or a turning wheel. In DE 35 410 43 A1, for this purpose, for example, an additional turning button is provided besides the turning wheel, wherein said turning button facilitates a highly geared down driven movement of the scan element. Such a fine positioning substantially extends the measurement time. Furthermore, certain measuring functions, for example, the measurement of a shaft or of a bore hole, cannot be performed with said type of elevation measuring device, or they cannot be performed in a simple manner.

U.S. 2004/0103548 A1 describes a similar elevation measuring device with a slide, which can be manually positioned in vertical direction by a hand crank, wherein said slide supports a scan head, and with a measurement- and display system, which detects a pressure force imparted by the scan head onto the work piece and detects the position of the scan head. During a measurement, an operator uses the hand crank in order to bring the scan head in contact with the work piece, and in order to impart a controlled pressure force onto said work piece. The strength, direction and duration of the pressure force is detected by the measurement system and displayed on a display. When the pressure force comprises a predetermined minimum strength and a rather short duration, the measurement value, which indicates the position of the scan head, is taken and displayed on the display. When the pressure force is maintained over a longer period of time, the measurement system automatically switches into an operating mode for measuring a shaft or borehole. The operator can then control the strength of the pressure force by the crank and he can scan a portion of the shaft or bore hole in order to determine, for example, an upper or lower reversal point. A position sensor or a pressure- or force sensor is used for switching the operating mode.

From practical applications, also coordinate measuring devices are known, in which the measurement head can be moved translatorically in two or three directions in space, or where it can even be pivotable about one or plural axes, see for example DE 196 41 720 C2 with further references. In order to perform measurements, mostly CNC (computer numerical control) control systems are used, which makes the devices expensive, and requires substantial knowledge and experience on the side of the operator for applications.

SUMMARY OF THE INVENTION

An elevation measuring device (1) comprises a measuring column (3) at which a vertically movable measuring slide (4) is supported, so it can be moved by hand and also by a drive motor (14) through a clutch device (15). The measuring slide (4) supports a scan head (8), which imparts a constant measuring force onto the measuring location at the work piece, which is generated by the drive motor (14) and the clutch device (15). A measuring system (19) detects the elevation coordinate of the scan head (8) and hands said elevation coordinate to a control device (21) for further processing and evaluation.

The control device (21) comprises logic (33) for automating the measuring process. This logic automatically detects a positioning of the scan head (8) in a certain direction, which is manually performed by the operator, subsequently controls the drive motor (14) in a suitable manner in order to cause a scanning of the work piece and determines the measurement values, which are relevant for the respective measurement, from the signals of the measuring system (19). The control device (21) can be configured to fully automatically detect the intention of the operator to measure either on a plane or in a bore hole or on a shaft, in one direction or in the opposite direction, and to independently initiate the intended measuring function.

With this background, it is the object of the present invention to provide a one- or multidimensional coordinate measuring device, which facilitates performing measurements according to the desired measuring functions. A desired measuring function should be executable, in particular, quickly, simply and with high precision. Preferably, this is accomplished by simple means.

It is another object of the present invention to provide a coordinate measuring device with processing- and control logic, which enables the operator to divert his entire attention to the work piece while performing a measurement, from positioning through measurement value determination.

This object is accomplished by the coordinate measuring device with the features according to the present invention.

According to the invention, a measuring device for performing at least one-dimensional coordinate measurements on a work piece is provided according to one of plural measuring functions selectable by an operator, wherein said measuring device comprises a base, on which a scan head is supported movable in the longitudinal direction. The scan head can be positioned by an operator in the respectively desired measurement position. A measurement system of the measuring device according to the invention detects the movement of the scan head and generates a measurement signal, which characterizes said movement. The measuring device comprises a processing device, which is configured to receive the measurement signals provided by the measurement system, and to process and evaluate said signals according to predetermined rules, in order to determine movement measurement values, characterizing a movement of the scan head 8 including its movement velocity and movement direction, and to provide a measurement value characterizing the position of the measurement head or the elevation of a measured point.

According to the invention, the logical rules furthermore comprise decision logic, which is configured to automatically detect a positioning performed by the operator only based on the movement measurement values and position measurement values, derived from the measurement signals provided by the measurement system, without any additional detection means, like pressure, force or contact sensors, and based thereon without an additional interaction of the operator, in particular, without an actuation of a key or similar, to automatically detect and start a particular measuring function desired by the operator. For this purpose, the decision logic analyzes the movement of the scan head performed by the operator based on the measurement signals, in order to detect the beginning of a measuring function and the measurement direction. In other words, a positioning performed by the operator in a certain direction is interpreted as an intention of the operator to perform a certain measurement in said direction.

In the simplest case, the measuring functions comprise a scanning of a plane in a possible movement direction of the scan head. In an elevation measuring device, the decision logic, for example, recognizes a downward movement of the scan head, in order to differentiate the measuring function "scanning from above" from the measuring function "scanning from below". Further possible measuring functions can be a scanning of a bore hole or of a shaft either in one direction or in the opposite direction along the movement direction of the scan head.

The designation "start measuring function" used in this description comprises at least a freezing or capture of a current stable measurement value, in order to be able to subsequently store, process and/or display said measurement value. Preferably, the initiation of the measuring function furthermore comprises the initiation of at least one of the subsequent processes: initiation of a motor driven scanning of the work piece, when a motor drive for the scan head is provided, loading the scan head with a constant measuring force, taking plural sequential measurement values, storing said measurement values, processing and/or display of the measuring value or of the measuring values.

The present invention facilitates a quick and simple execution of a measurement. The operator can position the scan head preferably by hand quickly and precisely in the desired measurement position. Fine positioning means which are difficult to operate are not required. The operator does not have to actuate a key or another control element, in order to start a measuring function. This is performed by the processing device according to the invention. Advantageously the operator can leave his attention solely on the work piece and only has to perform the positioning, while the processing device automatically collects, processes, stores and/or displays the associated data. The processing speed can be significantly increased and the measurement duration can be significantly reduced. This applies in particular when a plurality of points of a surface or a plurality of work pieces have to be tested.

In a preferred embodiment of the invention, the automatic detection and initiation of a measuring function is only implemented based on the measurement signals, which are provided by the measurement system and based on variables derived there from, characterizing the movement or position of the scan head. The processing device can be configured, for example, to determine the movement direction, movement velocity, movement distance and/or movement duration from the position measurement signals of the scan head by means of simple arithmetic operations, and to apply predetermined criteria to said variables in order to detect a measuring function. No separate detection means like contact sensors or similar are required.

In an advantageous embodiment of the present invention, which uses particularly simple and effective criteria, the decision logic comprises comparator logic for comparing the detected and derived variables with specified parameter values. Among said parameter values, there are minimum or maximum threshold values for the variables to be checked. Thus, for example, the desire of the operator to contact a plane in a certain direction can be automatically detected when the scan head is moved in the same direction during a minimum time interval with a minimum movement velocity. When the scan head is stopped, this is interpreted as a completed positioning.

The decision logic can also be configured to detect a scanning of a bore hole or of a shaft in a certain direction. This applies in particular in a preferred embodiment when a drive device with a motor for moving the scan head, or a measuring force generation device, is additionally provided. After detecting a performed scan head positioning, the decision logic can automatically instruct the drive device or the measurement force generation device to bring the scan head in contact with the work piece, and to load it with a constant measuring force. Subsequently, the decision logic continues to analyze the series of measurement signals. When the signal value is stable, it determines that a plane is being scanned. However, when the movement velocity constantly and continuously decreases with a constant movement direction, the decision logic can derive from the direction of the movement control and from the driving direction of the scan head, whether a scanning of a bore hole or of a shaft occurs. The decision logic subsequently activates the peak value memories associated with the respective measuring function and automatically completes, for example, a maximum- or minimum measurement at a bore hole or shaft, as soon as the current position of the scan head deviates by a minimum amount from the value of the peak value memory, and a movement velocity of approximately zero was detected there between. The minimum- or maximum value can be put out.

In a preferred embodiment of the invention, the decision logic can be parameterized. The parameter values required for the comparator logic can be specified by the operator. Thus, an adaptation to the respective operating conditions, in particular, a certain measurement type and a respective work piece are possible when required. In an advantageous embodiment, plural predefined and optimized parameter sets are provided to the operator for simplification and the operator can choose among said parameter set according to his requirements. It can also be provided, that the operator can define particular parameter values himself at will.

In a preferred improvement, the processing device is configured to automatically adapt the parameter values depending on one or plural measuring functions, which have already been performed. When the distances between the particular measurement objects are large, the parameters "minimum movement velocity" and "minimum time interval of movement velocity" can be automatically increased, in order to reduce the risk of a misinterpretation. When the distances are smaller, said parameters are automatically reduced. Additional parameters, like the "maximum movement velocity change", can be automatically adapted as a function of previously measured bore hole- or shaft diameters. The self-learning adaptive processing device thus created facilitates a high precision of the automatic detection of a measuring function command or intention, and can further increase the speed of the measurement.

In a preferred embodiment of the invention, the decision logic also comprises logic for detecting a short reversal of the movement direction of the scan head due to the elasticity of the measuring device. The decision logic can furthermore detect from very, rapid changes of the movement direction of the scan head that these are bounces which are caused by the impact of the scan head on the work piece. Such events are ignored. The maximum duration and distance of the movement direction reversal can be predefined as parameters and can be adapted.

The decision logic furthermore also comprises logic for cancelling a measuring function detection in process and logic for terminating an initiated measuring function. For this purpose, the operator does not have to press a key, but only has to change the movement direction of the scan head over a minimum distance and by a minimum movement velocity. This is detected by the decision logic as a cancellation or termination.

The measuring device according to the invention is preferably configured as an elevation measuring device, for example, with a vertical measurement column, at which a measurement slide is supported and guided so it is adjustable in elevation, which supports the scan head with the scan element mounted thereon. In an improvement, the measuring device according to the invention can also comprise a coordinate measuring device, which is used for performing measurements in a limited two-dimensional or three-dimensional measurement space. This applies in particular when the scan head can be moved by the operator by hand along two or three axes, which are perpendicular to one another. The scan head can also be supported so it is pivotable about one or plural axes.

The scan head preferably comprises a tactile scan element with a scan point with a suitable configuration, for example, ball shaped, which comes in contact with the work piece during the measurement. For certain measurements and work pieces, for example, when only planes are contacted, a scan element which scans without contact, in particular an optical or magnetic or capacitive scan element, can be provided.

A drive means can be operatively connected to the scan head, in order to drive the scan head. This can be a manual crank or a turning wheel. In a preferred embodiment, however, a motor drive, in particular an electric motor is provided.

In the drive train between the drive device and the measurement head, preferably a clutch device is inserted, which is used for providing a frictional connection between the drive device and the measurement head until a specified torque is reached. Thus, the scan element can be loaded with a defined measuring force, when the work piece is scanned in a driven manner. A friction clutch can be suitable, which comprises a constant and fine adjustable friction moment. However, also other, for example, magnetic clutches can be used. The motor forms a measurement force generation means together with the clutch, which is configured to achieve a defined constant measuring force. A measuring force generation means can also be configured by spring elements attached to the measuring slide or to the measuring head, by a piston-cylinder unit or by other suitable preloading means.

The processing device according to the invention is preferably a portion of a control device for controlling and monitoring the measurement process, which can, for example, be configured in the form of a computer, which is either directly mounted to the measuring device or mounted to the measurement column of an elevation measuring device, or also disposed remotely and connected through a hardwired or wireless communication link. The control device comprises input means, for example, key fields, which allow the operator to enter commands or parameters. Preferably, also a key or another activation means is provided, which allows the operator to activate or deactivate the decision logic according to the invention, when required, in order to allow also a conventional handling without automatic measurement function command detection to the operator. Furthermore, preferably also, a key or another actuation means is provided, by which the operator can preselect that the subsequent measurement relates to a plane or a bore hole or shaft. For example, after the preselection, many bore holes of one or plural work pieces can be checked in sequence without having to push any key in between the measurements.

The control device furthermore comprises output means for putting out information, which comprise the determined measurement values and, for example, an identifier of the measuring function performed at present. The output is preferably adapted according to the measuring function respectively detected by the decision logic. Additional data like entered parameter- or work piece designations or similar can be put out. Preferably, the output means also comprise optical, acoustic or other signalization means, which indicate certain operating conditions, in particular of the decision logic to the operator. Such a signaling means is preferably disposed in the field of vision of the operator, for example, at the measuring slide.

The method according to the invention and the processing device for automatic detection of a measurement function command or—intention of the operator as a consequence of a positioning performed by the operator increases the measuring comfort and the execution speed of the measurement, and substantially reduces operating errors. The operator does not have to remove his sight from the work piece or from another specimen. The decision logic can be advantageously implemented without increasing the production cost of the unit. The decision logic is preferably included in the firm- or software provided for controlling the measuring device. Thus, also existing elevation measuring devices or coordinate measuring devices can be retrofitted without problem and quickly. An implementation as hardware, however, is also possible.

BRIEF DESCRIPTION OF THE DRAWINGS

Other details of the advantageous embodiments of the invention are illustrated in the accompanying drawings, in which.

DETAILED DESCRIPTION OF THE PARTICULAR EMBODIMENTS

Figure 1:
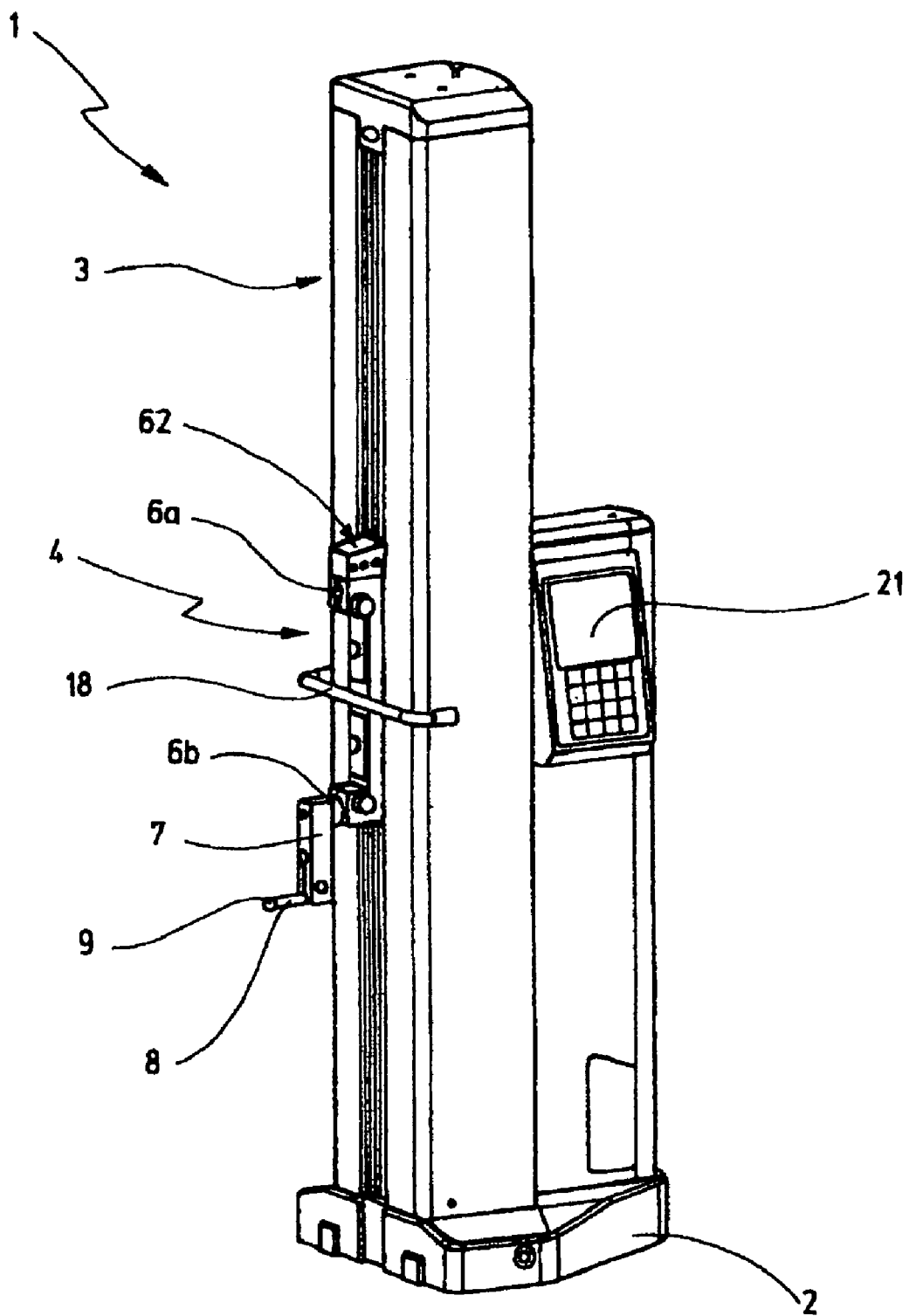
FIG. 1 shows an elevation measuring device in a simplified perspective view.

FIG. 1 illustrates a measuring device according to the invention in the form of an elevation measuring device 1, which comprises a base, which is placed onto a stable measuring plate, which is not shown here in detail. The base 2 is preferably supported on the measurement plate by sliding-, roller- or air bearings, in order to be able to manually move and position the measuring device 1 in horizontal direction (x-y plane). From the base 2, a measurement column 3 protrudes upward in the vertical direction, at which a measuring slide 4 is supported and guided. The measuring slide 4 comprises two receivers 6a, 6b at its respective ends for a measuring probe support. In the present case, a support 7 is mounted with one end in the lower receiver 6b, and carries a measuring head or measuring insert 8 at its other downward protruding end, wherein said measuring insert 8 is configured here in the form of a scanning stylus. Thus, depending in which of the receivers 6a, 6b and in which position, this means upward or downward protruding, the support 7 is mounted, four different measurement ranges can be comprised. The measurement head 8 comprises a ball shaped scanning tip 9 which forms the actual scan element by which a specimen is scanned. The scanning tip 9 can also assume a cylindrical, conical or other shape which is suitable for the respective measurement.

The measuring slide 4 is supported at the measuring column 3, so it can be vertically positioned. For this purpose, a drive band 11a, 11b is provided, which as is apparent in particular from FIG. 2, extends from the measuring slide 4 vertically upward to a pulley roller 12, from there vertically downward to a drive roller 13, provided in the base 2, and beyond said drive roller, as a drive band 11b, it extends back to the measuring slide 4. In the base shown in a partial sectional view in FIG. 2, furthermore, a drive means in the form of an electric motor 14 is provided, which is operatively connected to the drive roller 13 by a clutch device 15. The clutch device 15 is preferably a sliding clutch with a constant and fine adjustable friction moment, which accomplishes a loading of the contact element with a defined constant measuring force when scanning a specimen. Instead of a sliding clutch, also another suitable clutch, for example, a magnetic clutch can be used.

Figure 2:
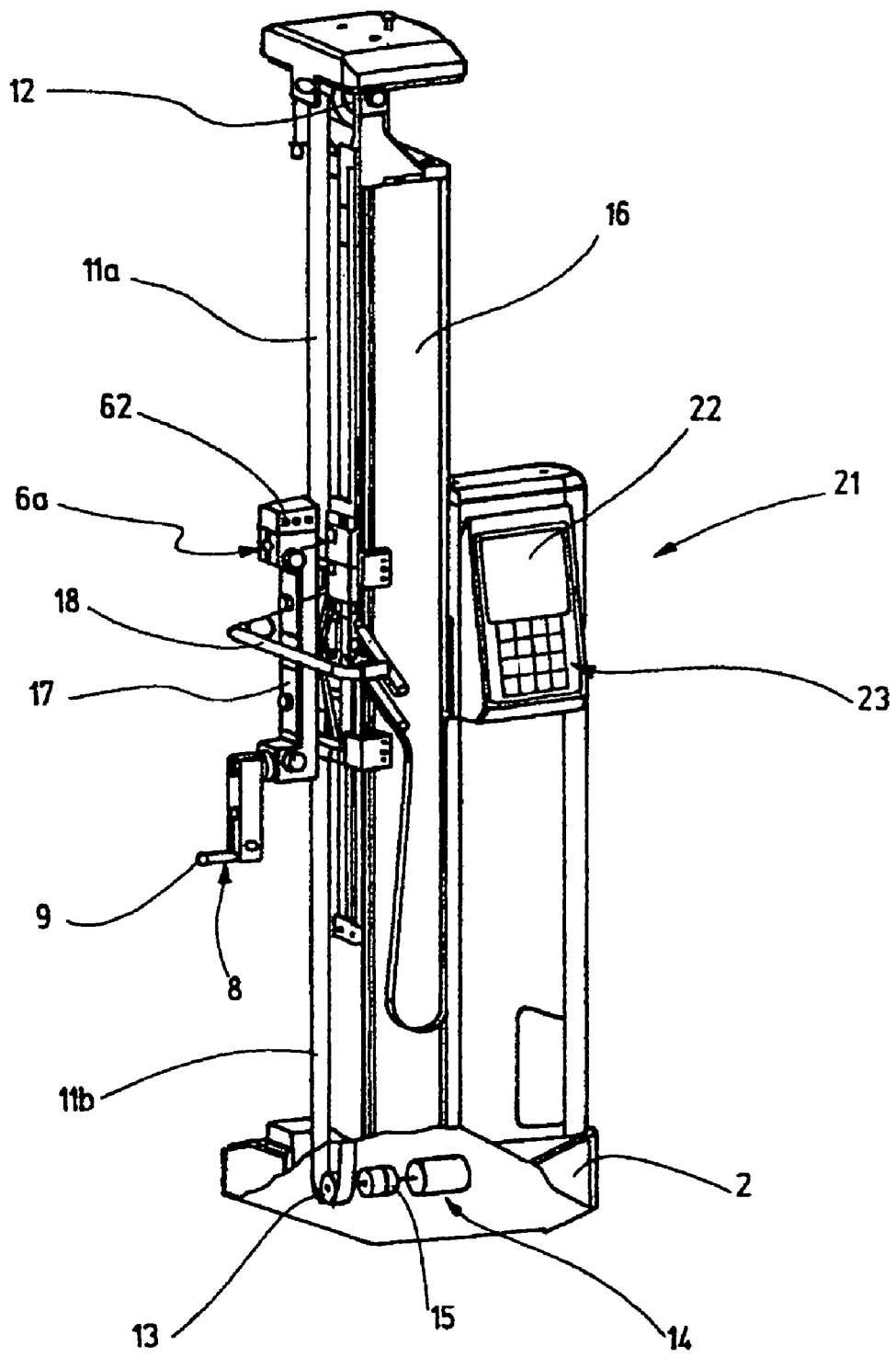
FIG. 2 shows the elevation measuring device according to FIG. 1 with a removed fairing in a partial sectional view.

In order to guide the measuring slide, a guide piece 16 is provided under the fairing which is removed in FIG. 2, wherein the measuring slide 4 runs along said guide piece. Said measuring slide is substantially disposed within the fairing, so that only an elongated receiver body 17, comprising the receivers 6a and 6b, protrudes outward through a vertical slot, provided in the fairing. A handle 18 is disposed on the receiver body 17, wherein said handle facilitates adjusting the measuring slide 4 in its elevation by hand.

Figure 3:
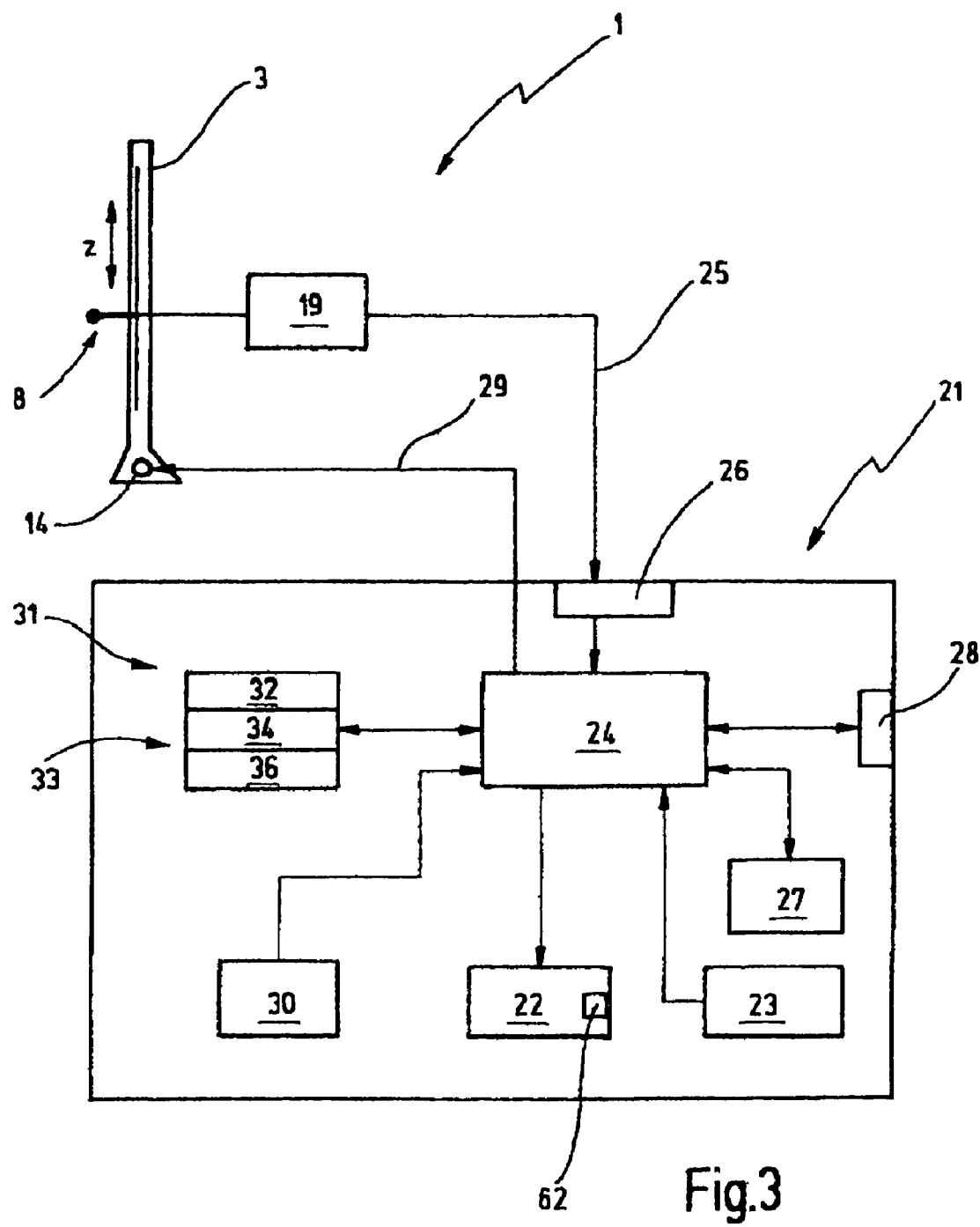
FIG. 3 shows a simplified block diagram, which illustrates the control device of the elevation measuring device according to FIG. 1 and FIG. 2.

A suitable measuring system 19 is provided for detecting the elevation position of the scan element 9 in z-direction. The measuring system 19 as it is only shown symbolically in FIG. 3 is preferably a length measuring system, which detects the position of the measuring slide 4 and which continuously supplies analog or digital measuring signals, which characterize said position. Preferably, a high resolution incremental reflected light measuring system 19 is used. However, also other state of the art measuring systems are suitable, which can operate optically, capacitively or inductively. For difficult ambient conditions, magnetic measurement systems, which are relatively resistant to dirt, are advantageous. The position of the scan head 8 can also be indirectly determined by detecting the rotation position of one of the rollers 12, 13 or of the drive shaft of the motor 14.

For receiving and processing the detected measurement signals and for controlling and monitoring the measuring process, a control device (21) is provided on the side of the measurement column 3, facing away from the measurement head 8, wherein said control device is configured as a computer 21. Said control device comprises output means configured as display 22 for displaying information, in particular measurement values, and input means 23 configured as single keys, by which an operator can manually enter commands or data into the computer 21. The control means 21 is illustrated in detail in FIG. 3. Thus, particular functional blocks of the control means 21 are depicted. The particular functional blocks can be implemented in hardware on a circuit board and/or in software or firmware as a portion of a program, which can be executed, for example, on a microprocessor. It is furthermore appreciated that particular functional units can be portions of other functional blocks which are illustrated here in detail. In case subsequently logical rules or logic of the control means 21 are discussed, the scope of the invention is thus not restricted to any of those embodiments.

As illustrated in FIG. 3, the control means 21 according to the invention comprises control logic 24, which controls the measurement process, the processing of the measurement signals, the handling of commands, data and parameters, and the function of other functional units. The control logic 24 is connected through a suitable communication link 25 to the measurement system 19, in order to receive the measurement signals 25, put out by the measurement system 19 through an input interface 26. Furthermore, the control logic 24 is data linked to the input means 23, to the display or to other output means 22 and to a memory device 27, in which programs, parameters, measurement values or other data can be stored. Furthermore, the control device 21 comprises an output interface 28, by which the control logic 24 can be connected to a remote computer or similar. Through a control link 29, the control logic 24 furthermore controls the electric motor 14. The control logic 24 is periodically supplied with a timing signal by the timer 30. Additional possibly required devices or means like, for example, an energy supply are omitted in FIG. 3 for reasons of clarity.

As it is further apparent from FIG. 3, the control device 21 comprises a processing device or logic 31, which is configured to receive the measurement signals supplied by the measuring system 19, and which comprises logic rules 32, in order to process and evaluate said measurement signals and to determine there from a measurement value, which characterizes the position of the scan head. The processing logic 32 can be used to convert the analog signals supplied by the measurement system 19 into digital signals, or to convert digital signals into a format which is suitable for processing, and to filter them and to monitor them, to apply stability criteria to a measurement value, to determine a distance between measurement points or a maximum, a minimum, or a center point, or a diameter of a shaft or bore hole, and to receive the determined measurement values or data or to relay them to other units.

The elevation measuring device 1 described supra functions in normal operating mode as will be described infra:

It is being assumed, for example, that an operator wishes to perform the scanning measuring function from above on a plane of a work piece. For this purpose, the operator positions the work piece on the measurement plate, so that the scan element 9 is at the desired position above the point to be measured. Subsequently, the operator moves the measuring slide 4 vertically downward in order to position the scan head.

Thereafter, the operator actuates the associated measurement function key(s) of the keypad 23 in order to indicate to the control device 21 that the plane is to be contacted from above. Subsequently, the control device 21 controls the motor 14, in order to bring the scan head 8 in contact with the measuring plane or to keep it in contact with the measuring plane, and to load the scan element 9 with a constant measurement force. The measurement signals 25 supplied by the measurement system 19 are processed in a suitable manner by the processing logic 32, in order to determine a stable measurement value, which displays the elevation coordinate of the measurement point, wherein said measurement value is displayed on the display 22, and stored, for example, in the storage device 27. After the measurement value has been taken, the measuring slide 4 can be moved vertically upward again, the work piece can be moved into another position and another measurement process can be performed.

When the operator, for example, wants to determine a lowest point (a minimum) of a bore hole, he positions the scan element 8 eccentric above the bore hole cut out to be measured, thus laterally offset with respect to the minimum, and actuates the associated input means in order to start said measuring function. When the measuring function is performed, the scan element 9 has to be run over the minimum one or plural times. For this purpose, the operator either moves the work piece or the elevation measuring device in horizontal direction. The processing logic 31 determines the associated measurement values and determines the elevation coordinate of the minimum there from. In the same manner, also other measurement functions, for example, the measurement of an upper bore hole cutout, scanning a shaft from above or from below, determining the diameter and the center of a shaft or a bore hole, the computation of a distance between two surfaces, etc. can be started respectively and performed by positioning the scan element 9 with reference to the work piece and by actuating the associated input means 23.

The control device 21 according to the invention also comprises an extended operating mode, which facilitates a more automated and faster execution of measurements. For this purpose, the logic rules of the processing device 31 comprise a decision logic 33, which is configured to automatically detect a positioning performed by the operator, to automatically detect the measuring functions respectively intended by the operator, and to initiate them. This detection is performed solely based on the measurement signals 25 supplied by the measurement system 19 without requiring additional sensors or similar for this purpose.

The processing logic 32 of the processing device 31 comprises logic rules in particular, which are configured to determine additional relevant variables from the measurement signals 25 supplied by the measuring system 19. Among these variables are, at least either, movement velocity, movement direction, movement duration and/or movement acceleration of the measuring slide 4. These variables are analyzed by the decision logic 33 in order to automatically detect the intent of the operator to start a certain measuring function. The decision logic 33 comprises comparator logic 34 in the preferred embodiment, which compares variables determined by the processing logic 32 with the predetermined parameter values and comprises predetermined criteria rules 36, which are applied to the determined variables. The details of the decision logic 33 are subsequently described with reference to the flow diagrams illustrated in FIGS. 4 and 5, which illustrate the process of an automatic detection of a command or intention of an operator to start a scan of a plane or a bore hole or shaft in a certain direction.

Figure 4:
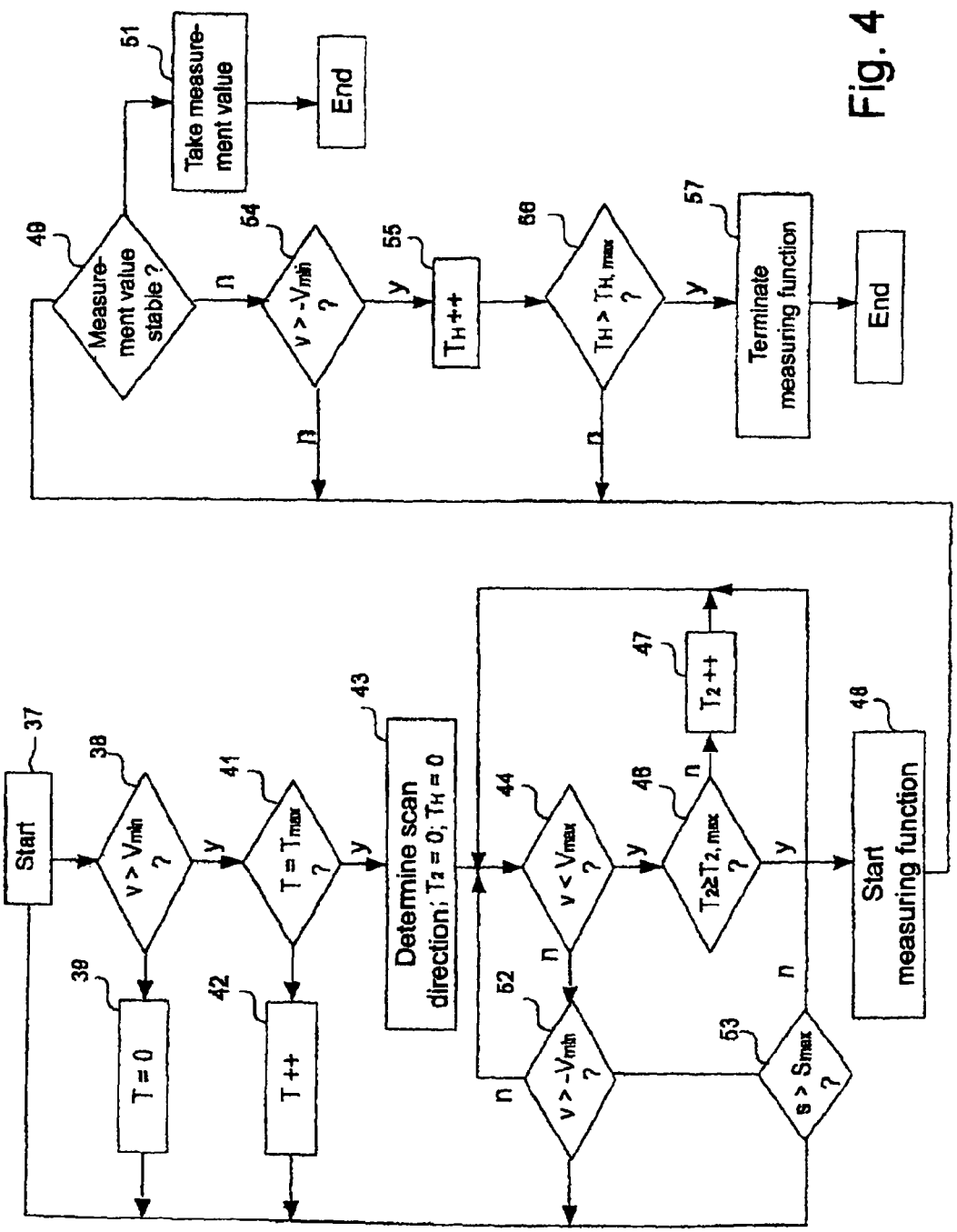
FIG. 4 shows a flow diagram, which illustrates an embodiment of logic according to the invention for automated measuring function command detection.

FIG. 4 illustrates the process of a measurement, when scanning a plane. The measurement process is started in block 37, where the operator places a work piece on the base plate in a suitable measuring position and moves the measuring slide 4 towards the measuring plane. In block 38, the comparator logic 34 compares the movement velocity v determined by the processing logic 32 with a first parameter $V_{min}$, which characterizes a minimum movement velocity. If the minimum movement velocity $V_{min}$ is not exceeded, an elapsed time meter T is zeroed in block 39, and the movement velocity is monitored continuously. When the minimum movement velocity $V_{min}$ is exceeded, the elapsed time meter T in block 41 is compared to a threshold value $T_{max}$. If $T_{max}$ is not reached, the elapsed time meter T is incremented in block 42 and the processing returns to block 38. Otherwise, if $T=T_{max}$, thus the measuring slide 4 has been moved with a minimum movement velocity during a minimum movement interval, a positioning of the measuring slide 4 is detected. Subsequently, the contact direction is determined in block 43 from the measurement values, for example, the upward direction or the downward direction are determined and additional elapsed time meters $T_2$ and $T_H$ are initialized and zeroed.

Subsequently, the decision logic 33 determines if the positioning process is completed, thus the measuring slide 4 has been stopped. Thus, the movement velocity v is compared in block 44 with a parameter $V_{max}$ characterizing a standstill velocity, and if $v<V_{max}$ applies, it is checked in block 46, if a minimum time duration of the standstill of the slide 4 has been reached ($T_2 \geq T_{2,max}$?). If this is not the case, the elapsed time meter $T_2$ is incremented in block 47 and the standstill velocity continues to be monitored. If the threshold value has reached $T_{2,max}$, the measuring function in block 48 is started by the control device 21, bringing the scan element 9 in contact with the measurement plane through the electric motor 14, and loading it with a constant measuring force in order to determine the current measurement value. As soon as the measurement value is sufficiently stable, thus as determined by block 49, it does not change substantially anymore, the measurement value is taken in block 51, stored and displayed on a display 22, which is adapted to the measuring function. The routine then returns to the start block 37, in order to continue with the detection of a subsequent positioning of the measuring slide 4.

The operator can measure a plane at plural subsequent points by positioning the measuring slide 4 manually at the respective measurement points, wherein the decision logic according to the invention automatically detects and executes the associated measuring function. The operator does not have to remove his sight from the specimen, so that his workflow is not interrupted. The automatic detection increases the measuring comfort and the execution speed of the measurement and reduces operator errors.

The operator can cancel a command detection, thus the detection of a positioning prior to starting the measuring function, anytime without having to actuate a key of the computer 21 for this purpose. For this purpose, the operator manually moves the measuring slide 4 into the direction opposite to the contact direction over a sufficient distance, which is determined by the decision logic 33 in the form of the blocks 52 and 53 as a cancellation of the command. The decision logic 33 determines in detail in block 52 if the absolute value of the velocity in the opposite direction is greater than the minimum velocity $V_{min}$, thus if $v < -V_{min}$. If this is not the case, the routine returns to block 44 in order to monitor the standstill velocity. Otherwise, the movement distance s in the direction opposite to the scanning is compared to a threshold value $S_{max}$ (block 53) in order to determine if this is only a short reversal or a longer reversal of the movement direction of the measuring slide 4. A short directional reversal is possible due to the elasticity of the friction clutch and of the mechanism of the elevation measuring device 1, which comprise a certain hysteresis, and does not lead to a cancellation of the command recognition. When a longer direction reversal is detected, if $s > S_{max}$, however, the command recognition is cancelled, and the routine returns to the starting step 37, as illustrated in FIG. 4. When the measuring function has already been initiated, it can be terminated in this manner or likewise by reversing the movement direction of the measuring slide 4 by hand without pressing a key. In principle, the same logic can be used like when cancelling the measuring function recognition. In a modified criterion which is illustrated in FIG. 4, a minimum movement velocity in the direction opposite to the scanning direction ($v < -V_{min}$ in block 54) during a minimum time interval ($T_h > T_{H,max}$ in block 56) is necessary to terminate a measurement. The hysteresis time duration counter is periodically incremented in block 55. If both conditions 54 and 56 are fulfilled, the measurement function started in block 57 is terminated.

Figure 5:
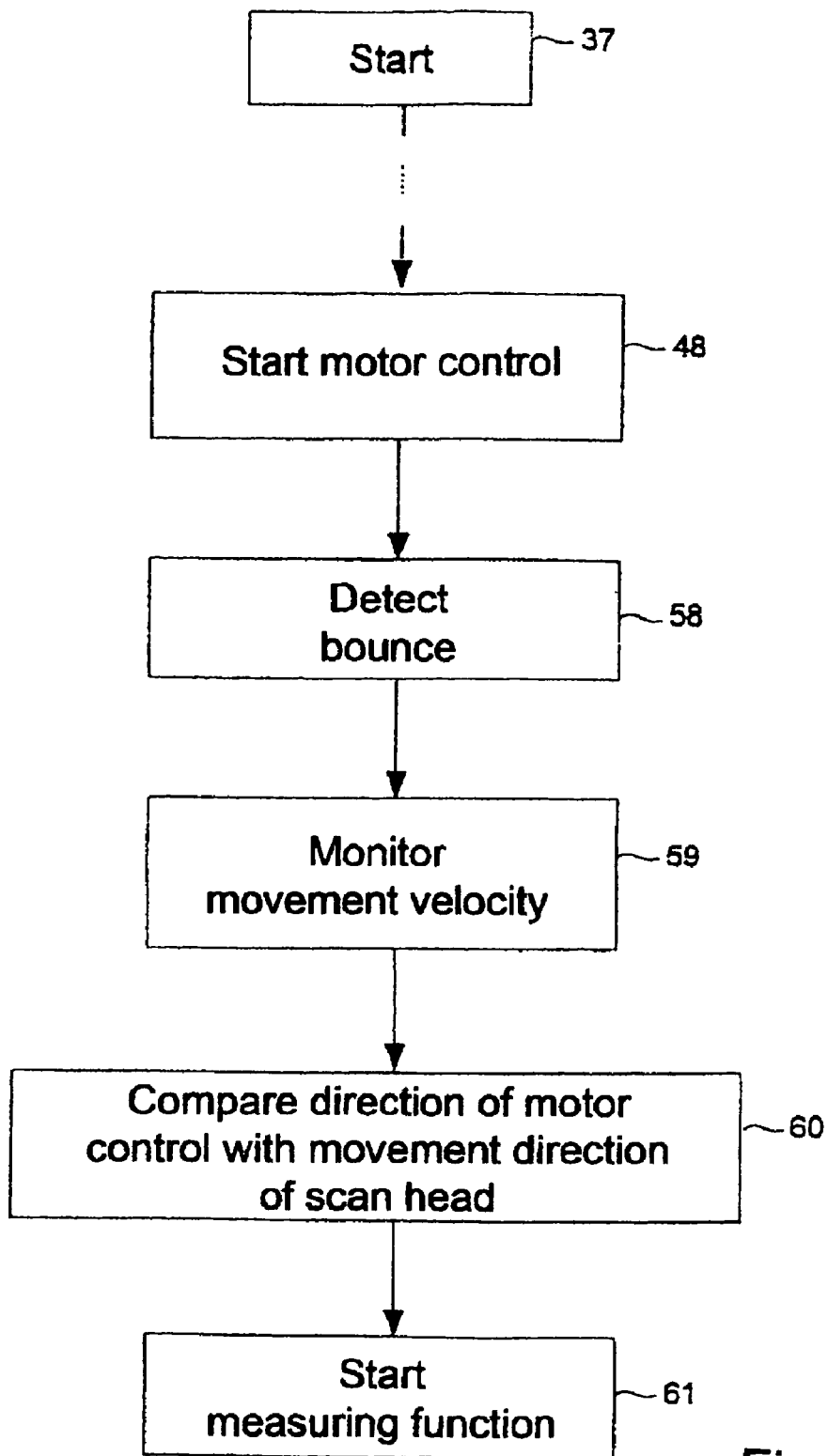
FIG. 5 shows a flow diagram of logic according to the invention for automatic command detection when scanning a shaft or a bore hole; and, FIG. 6 shows an embodiment of a multiple coordinate measuring and testing unit according to the present invention in a highly schematic principle perspective illustration.

The decision logic according to the invention also facilitates an automatic command recognition in case of a scanning on a shaft or in a bore hole. A flowchart with this respect is illustrated in FIG. 5. The initial movement analysis is performed like the detection of a scanning of a plane until the motor control is started (block 48). However, the measurement series is further analyzed according to the following criteria: When the movement direction changes very quickly, a bounce has occurred, which has been caused by the impact of the scan element 9 onto the work piece (block 58). These bounces are ignored. When the movement velocity continuously decreases with constant moving direction, then a borehole or a shaft is being scanned (block 59). It can be derived from the motor control and from the moving direction of the measuring slide 4, which type of scanning has occurred (block 60). When the motor control operates downward and the movement direction of the measuring slide coincides with the movement direction of the motor control, then a borehole is being measured. When the movement direction of the measuring slide 4 is opposite to the movement direction of the motor control, then a shaft is being measured. When the direction of the motor control is upward, then the criteria are reversed. In this case a shaft measurement is desired, when the movement direction of the scanning head corresponds to the movement direction of the motor control.

When the decision logic 33 determines that the operator performs a borehole measurement or a shaft measurement in a certain direction, either upward or downward, the respective peak value memories of the memory device 27 are activated to take the measurement values (block 61). The measurement is completed when the current position of the measuring slide 4 deviates from the one in the threshold memory by a minimum amount and a movement velocity of approximately zero was determined in between. In this case the measurement value stored in the peak value memory characterizes the maximum or the minimum of the borehole or shaft. When the actual position of the slide deviates by a large amount from the one of the peak value memory, the current measurement is aborted irrespective of the value of the movement velocity.

According to the invention the threshold- and limit values used by the comparator logic 34 are preferably adjustable parameters, which are specified in a suitable manner depending on the current measuring conditions. It can be specified, for example, that the operator can select from plural predefined parameter sets according to his requirements. In a preferred embodiment the following parameter values were empirically determined for the decision logic 33 according to the invention: the time intervals between two measurement value determinations should be approximately 10 to 50 ms (milliseconds). Then, also very slow movements can be detected at a clock speed of 2 ms. In order not to measure accidental bounces, the minimum movement velocity $V_{min}$ can be approximately 5 mm/s (millimeters per second). In order to suppress the hysteresis of the friction clutch and of other components of the elevation measuring device a short reversal of the movement direction is assumed at a maximum movement distance of $S_{max} = 2$ mm. A longer reversal of the movement direction, by which the measurement function detection is cancelled is detected from a driving distance of at least $S_{max} = 50$ mm. The minimum movement velocity $V_{min}$ for the cancellation of the measuring function is 50 mm/s. Bounces are detected when the changes of the movement direction last for less than 280 ms. For determining the scanning of a borehole or a shaft, the maximum movement velocity is approximately 5 mm/s and the maximum velocity change is approximately 1 mm/s$^2$. Depending on the operating environment the parameters can also significantly differ from the exemplarily values listed herein.

It can be provided that in addition to the predefined and optimized parameter sets the operator can enter particular parameters also by himself through input means 23 at will. It can further be provided in an improvement of the invention that the control device 21 automatically adapts the parameter values depending on the measurement functions already performed. When the distances between the measuring plans are, for example large, then $V_{min}$ and $S_{max}$ can be automatically increased for a short driving direction reversal as well as for a longer driving direction reversal in order to further reduce the risk of a misinterpretation. Depending on the borehole- and shift diameters previously measured, also the parameters used for determining a bounce or a continuous movement velocity reduction can be automatically adapted. The execution speed of the measurement can thus be increased even further.

According to the invention further modifications and improvements are possible. Thus, for example a turning wheel or a hand crank can be provided as manual drive devices. Also other control devices known from the state of the art can be used for scanning. The procedure according to the invention where the measuring slide 4 is positioned by the operator by hand and the drive motor 14 is used in order to scan the work piece and to provide a constant measuring force is preferred, however, since it facilitates a fast and precise positioning of the scan element 9. Instead of the friction clutch 15 also other clutches with similar functions, for example, a magnetic clutch can be used. The measuring force generation device 14, 15 can also be configured as a spring system or similar.

In a simplified embodiment a key is provided to the operator, which is provided at the computer 21 or preferably in the field of vision of the operator when measuring on the measurement column 3, or on the measuring slide 4, by which he can select on the one hand, if the function to be initiated is the measurement of a plane, or the measurement of a borehole dimension or of a shaft dimension. A positioning is automatically detected by the control device 21, which then automatically turns on the motor driven scanning and performs the selected measuring function. In case of 2D-measurements, by which many boreholes or shafts are tested in sequence one after the other all can be measured without having to actuate the key again.

Another embodiment is illustrated in FIG. 1 here additional signaling device 62 is provided which indicates the status of the automatic command recognition and measurement function initiation to the operator. For this purpose LED's (light emitting diodes) can be provided at the measuring column 3 and at the measuring slide 4, which indicate, for example, that a positioning determination is progress, a positioning was determined or a measurement value was taken and the measurement is completed. Certainly also other implementations of the signaling device, for example, in the form of a single light which can be on or off, or which can flash in order to indicate the status, or in the form of an acoustic signaling device are possible.

Figure 6:
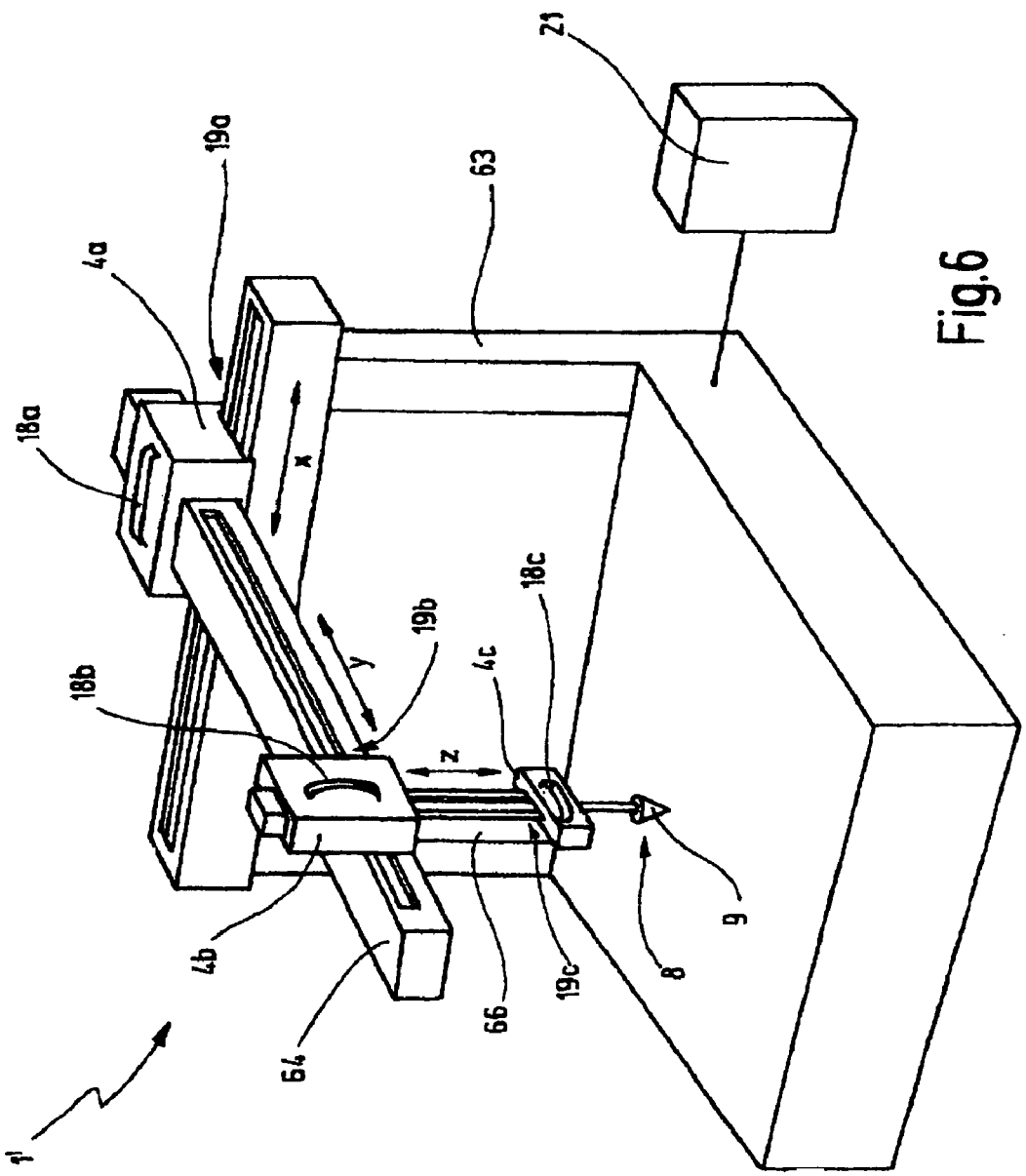

The concept according to the invention to automatically determine a positioning and a measuring function can also be applied to multi dimensional measuring devices. In FIG. 6 a three dimensional coordinate measuring device 1' is illustrated in a highly simplified illustration in principle, which facilitates performing a measurement in a three dimensional space. For this purpose a first measuring slide 4a is supported and guided at a portal 63 so it is moveable in horizontal direction. A handle 18a is provided at the measuring slide 4a for manual adjustment. A support arm 64 is furthermore mounted to the measuring slide 4a wherein said support arm protrudes forward in a horizontal y-direction perpendicular to the x-direction. At the support arm 64 an additional measuring slide 4b is supported moveable in y-direction, wherein a handle 18b is provided at the measuring slide 4b. The measuring slide 4b furthermore supports a guide piece 66 which extends in a z-direction which is perpendicular to the x-y plane and which guides another measuring slide 4c in said direction. The measuring slide 4c comprises a handle 18c and supports a scan element 9 at its lower end. A measuring system 19 which is not shown here in more detail is associated with each measuring slide 4a, 4b and 4c, wherein said measuring system determines the respective x-, y-or z-position of the scan element 9.

An operator can move the scan element into any position in the measuring space through the handles 18a, 18b, 18c, wherein the positioning and the desired measuring function are detected by the control device 21 according to the invention and the intended measuring function is initiated by, for example, taking the measurement values of the coordinates and displaying them. Thus it can be determined that the last driven movement determines the scanning direction. Instead or in addition to the linear movement along the x-, y- and z-axis also a pivoting of the scan element 9 about at least one pivot axis can be provided.

What is claimed is:

1. A measuring device for performing at least one-dimensional coordinate measurement on a work piece according to one or plural measuring functions selectable by an operator, said measuring device comprising:
    a base piece (3; 63, 64, 66), where a scan head (8) is supported moveable in longitudinal direction in order to be positionable by an operator in the respective measuring position,
    a measuring system (19) for detecting the movement of the scan head (8) and for generating measuring signals (25) characterizing said movement; and,
    a processing device (31) for receiving the measuring signals (25) provided by the measuring system (19) and for processing and evaluating the measuring signals (25) according to predetermined logical rules (32) for determining movement measurement values characterizing a movement of the scan head (8) including its movement velocity and movement direction and for providing position measurement values characterizing the position of the scan head (8),
    the logical rules (32) comprise a decision logic (33) for automatically detecting a positioning performed by the operator solely based on the movement measurement values and the position measurement values, said decision logic (33) for detecting the measurement function intended by the operator and for initiating said measurement function,
    the decision logic (33) comprises a logic which is configured to:
        determine the velocity (v) at which the scan head (8) is moved and compare it with a first threshold value ($V_{min}$) characterizing a minimum movement velocity;
        determine the time interval (T) of the movement with the minimum movement velocity and compare said time interval to a second threshold value ($T_{min}$) characterizing a minimum time interval,
        determine the direction in which the scan head (8) is moved; and
        determine a positioning of the measuring head based on the result of the comparisons and select and initiate the suitable measuring function including the measuring direction.

2. A measuring device according to claim 1, wherein the measurement functions comprise scanning a plane, a borehole or a shaft, either in one direction or in the opposite direction along the movement direction of the scan head (8).

3. A measuring device according to claim 1, wherein the initiation of the measuring function comprises taking the current measurement value and can furthermore comprise the initiation of at least one of the following processes: initiating a motor driven scanning of the work piece, loading the scan head (8) with a constant measuring force, taking a series of sequential measurement values, storing, processing and/or displaying the measurement value or the measurement values.

4. A measuring device according to claim 1, wherein the decision logic (33) is for causing the automatic detection and initiation of a measuring function based on the measuring signals (25) and variables derived therefrom characterizing the movement or position of the scan head (8), said derived variables comprise at least one of the variables: movement direction, movement velocity, movement distance and/or movement duration of the scan head (8).

5. A measuring device according to claim 4, wherein the decision logic (33) further comprises a comparator logic (34) for comparing the detected or derived variables with specified parameter values which comprise minimum and maximum threshold values.

6. A measuring device according to claim 5, wherein the parameter values are adjustable.

7. A measuring device according to claim 5, wherein the processing device (31) is for automatically adapting the parameter values depending on at least one measuring function which has already been performed.

8. A measuring device according to claim 1, further comprising a measuring force generation device (14, 15) for loading the measuring head (8) with a constant measuring force and wherein the decision logic (33) further comprises a logic which is configured to:
  determine the movement direction of the scan head (8);
  detect a continuous reduction of the movement velocity with constant movement direction;
  compare the movement direction of the scan head (8) to the effective direction of the measuring force generation device (14, 15); and
  determine based thereon, if a borehole is being scanned or a shaft and in which direction the scanning is performed.

9. A measuring device according to claim 1, wherein the decision logic (33) further comprises logic for detecting a short reversal of the movement direction of the scan head (8) caused by an elasticity of the measuring device.

10. A measuring device according to claim 1, wherein the decision logic (33) further comprises logic for detecting a bounce of the scan head (8), which has physical causes.

11. A measuring device according to claim 1, wherein the decision logic (33) further comprises logic for cancelling a measuring function detection in process and further comprises logic for terminating a measuring function which has been initiated.

12. A measuring device according to claim 1, wherein the decision logic (33) can be activated and deactivated by the operator.

13. A measuring device according to claim 1, wherein the scan head (8) comprises a tactile scan element (9).

14. A measuring device according to claim 1, wherein the scan head (8) comprises a scan element, which scans without contact.

15. A measuring device according to claim 1, further comprising a handle means (18; 18*a*, 18*b*, 18*c*) for manually driving the scan head (8).

16. A measuring device according to claim 1, further comprising a drive device (14) for generating a measuring force, said drive device (14) operatively connected to the scan head (8) for moving said scan head.

17. A measuring device according to claim 16, wherein the drive device (14) comprises a motor.

18. A measuring device according to claim 16, further including a clutch device (15) for generating a measuring force, said clutch device (15) is provided in the drive train between the drive device (14) and the scan head (8) in order to provide a frictional connection between said components until a specified torque is reached.

19. A measuring device according to claim 18, wherein the clutch device (14) is configured as a slipping clutch.

20. A measuring device according to claim 18, wherein the measuring force generation devices (14, 15), are for loading the scan head (8) with a constant measuring force when a work piece is being scanned.

21. A measuring device according to claim 1, wherein the measuring system (19) is configured as a length measuring system.

22. A measuring device according to claim 1, wherein the processing device (31) is a component of a control device (21) for controlling the measuring process, wherein the control device (21) comprises input means (23) for entering commands or data and output means (22) for putting out information.

23. A measuring device according to claim 1, further comprising a signaling device (62), which indicates the current status of the decision logic (33) to the operator.

24. A measuring device according to claim 1, further comprising an elevation measuring device (1) with a measuring column (3) at which a measuring slide (4) is supported and guided, the measuring slide (4) is operable in the vertical direction, and the scan head (8) is mounted to said measuring slide (4).

25. A measuring device according to claim 1, comprising a coordinate measuring device (1') in which the scan head (8) is positioned in a two dimensional measuring plane or in a three dimensional measuring space.

* * * * *